Jan. 16, 1945.      M. A. GREENFIELD      2,367,211
                     PRESSURE GAUGE
              Filed March 31, 1943
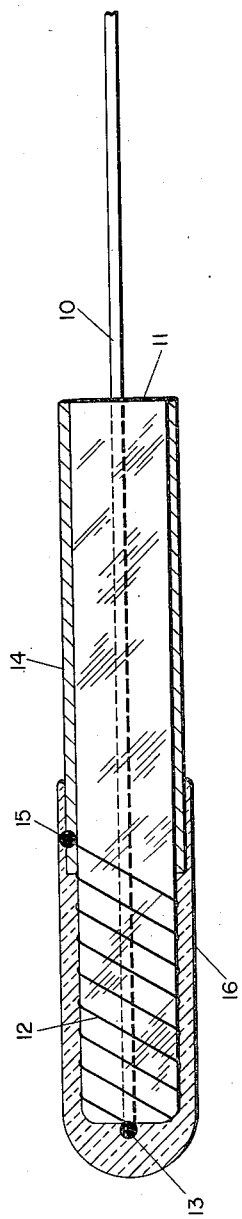
INVENTOR.
MOSES A. GREENFIELD
BY
HIS ATTORNEY Patented Jan. 16, 1945

2,367,211

UNITED STATES PATENT OFFICE 2,367,211

PRESSURE GAUGE

Moses A. Greenfield, Cabin John, Md.

Application March 31, 1943, Serial No. 481,199

5 Claims. (Cl. 201—63)

(Granted under the act of March 3, 1883, as amended April 30, 1928; 370 O. G. 757)

This invention is in pressure gauges, and specifically it is a gauge intended for underwater use in the measurement of shock waves such as are produced by explosions.

The gauge utilizes the well-known principle that the electrical resistance of certain materials changes as and when the materials are placed under strain.

Important considerations in a gauge of the nature mentioned are (1) that it be water-tight so that leaking can not produce shorting and spurious readings—although it will be understood, of course, that the gauge will operate in air and other mediums as well as in water, (2) that its mass be small, to eliminate inertia effects when used in connection with high-velocity pressure waves, (3) that its dimensions be smaller than the length of the wave it is to measure, and (4) that, for faithful measurements, hysteresis effects be held to a minimum.

The principal objects of this invention are to produce a pressure gauge having the characteristics above indicated as essential for proper performance. Additional objects will appear from a reading of the following specification and claims.

The single figure of the drawing is a longitudinal view of the gauge of the invention, partly in section.

The description of the invention which will follow will include also the method of manufacture, since the two are closely related; and the structure of the gauge will be readily apparent from the method of its making.

With reference to the drawing, 10 is a conducting wire, which may be assumed to be made of Kovar metal. Over this wire is slipped a glass tube 11 whose internal diameter approximates the diameter of wire 10. The length of the glass tube will vary with the requirements of the gauge, but ordinarily will be from one half to one inch in length. It should not extend beyond either end of the wire. The glass should be matched, with regard to thermal characteristics, to the metal of the conductor 10, and also must be capable of wetting thoroughly, when melted, the said metal. These conditions are met—assuming wire 10 to be of Kovar—by so-called 705 glass.

After slipping tube 11 over the wire, the glass is fused, thus sealing conductor 10 in the glass. In a gauge for the purposes mentioned, the diameter of the mass at this point will be about ⅛ inch. Resistance wire 12, the nature of which will vary with the individual gauge, but which will be described as 1 mil Advance wire, is spot-welded to one end of conductor 10, as at 13, and is then wound about the tube 11. A sleeve 14 of Kovar metal, the internal diameter of which is approximately that of the glass covered wire, is slipped thereover, and the second end of resistance wire 12 is spot-welded to sleeve 14, as at 15.

The unit is placed within a closed end glass tube 16, the proportions of which are such as to cover resistance wire 12, spot-weld 15, and a portion of sleeve 14, the closed end of the tube fitting closely over the end 13, of the resistance element. Tube 16 is then fused, the heat being applied first at the closed end thereof, and progressing toward the other end, by this means avoiding the entrapment of air bubbles in the glass.

The resulting structure is a unitary element of glass and metal, including the resistance element proper 12, and contacts or terminals therefor comprising conductor 10 and sleeve 14. Since glass is substantially non-porous and non-hygroscopic, the gauge can be used indefinitely under water. The overall length—the largest dimension—can be held headily to about one half inch; and the total weight of the gauge is but a small fraction of an ounce. Glass is quite sensitive to pressure changes, and suffers little from hysteresis.

In use, the sleeve 14 may be covered or not, as desired. In either case, no short circuit is possible, since the terminals are thoroughly insulated from each other by the glass of tube 11.

For underwater work, connection is made to the terminals of the gauge by an insulated cable of any convenient type, and the device is merely hung in the water at the desired point.

A simple electrical circuit including a battery or other source of potential, the resistance of the gauge, and a ballast resistance may be utilized. An oscillograph measures the change in voltage across the gauge as pressure varies the resistance thereof.

A specific embodiment of the invention has been described and shown. It should be understood, however, that the scope of the invention is not to be determined by the foregoing description, but instead by the appended claims.

This invention may be manufactured and/or used by or for the Government of the United States of America without the payment to me of any royalty thereon or therefor.

I claim:

1. In a pressure gauge for use in the measurement of pressure waves of extremely short lengths, such as produced by the underwater detonation of high order explosives, a conducting helix adapted to have its electrical resistance varied by the application of pressure thereto, an elastic, pressure-sensitive, insulating coating for said helix, and a conducting sleeve extending from one end of said helix and forming a watertight joint with said coating, the effective length of said gauge being no greater than the lengths of the waves to be measured.

2. In a pressure gauge for use in the measurement of pressure waves of extremely short lengths, such as produced by the underwater detonation of high order explosives, a pressure-sensitive resistance element comprising a glass body portion, a helix embedded therein, a conducting wire passing therethrough and connected at one end to an end of the helix, and a conducting sleeve connected to the other end of the helix and partially embedded in said body, the length of said helix being no greater than the lengths of said waves.

3. In a pressure gauge for use in the measurement of pressure waves of extremely short lengths, such as produced by the underwater detonation of high order explosives, a conductor, a glass coating thereon, a conducting sleeve substantially concentric with said conductor and spaced therefrom by the glass coating and longitudinally spaced from one end of the conductor, a resistance wire secured to the said end of the conductor and wound upon the glass coating and secured to the sleeves, and a fused, substantially bubble-free, glass coating covering the connection between the resistance wire and the said end of the conductor and extending over the resistance winding and over the connection between it and the sleeve.

4. In a pressure gauge for use in the measurement of pressure waves of extremely short length, such as produced by the underwater detonation of high order explosives, a central conductor wire, a fusible insulative sleeve encircling the wire, a metallic filament whose resistance varies with changes in pressure, said filament being disposed over one end portion of said sleeve and being connected at one end to said central conductor wire, a metallic conductor tube encircling said sleeve adjacent said sleeve end portion and connected at one end portion to the other end of the filament, and a fusible insulative coating extending over said filament and overlapping said tube end portion, said coating being fused to said filament, said sleeve end portion and said tube end portion to provide an integral, solid, waterproof, shock-resistant body.

5. In a pressure gauge for use in the measurement of pressure waves of extremely short length, such as produced by the underwater detonation of high order explosives, a central conductor wire, a glass sleeve encircling the wire and fused thereon, a helical metallic filament whose resistance varies with changes in pressure, said filament encircling said sleeve at one end portion thereof and being connected at one end to said central conductor wire, a metallic conductor tube encircling said sleeve adjacent said end portion and connected at one end portion to the other end of said filament, and a glass coating extending over said filament and overlapping said tube end portion, said coating being fused to said filament, to the sleeve end portion between the convolutions of said filament, and to said tube end portion to provide an integral, solid, waterproof, shock-resistant body.

MOSES A. GREENFIELD.